United States Patent [19]
Jackson et al.

[11] 3,740,526
[45] June 19, 1973

[54] METHODS OF WELDING TOGETHER SHEETS TO FORM WALLS, TANKS OR THE LIKE

[75] Inventors: Robert G. Jackson, Hornchurch; Edward Armstrong, Darlington, both of England

[73] Assignee: Conch International Methane Limited, Nassau, The Bahamas

[22] Filed: Mar. 8, 1971

[21] Appl. No.: 121,975

[30] Foreign Application Priority Data
Mar. 19, 1970 Great Britain.................. 13,248/70

[52] U.S. Cl.................. 219/137, 219/125 R, 228/45
[51] Int. Cl............................................. B23k 9/12
[58] Field of Search......... 219/137, 125 R, 125 PL, 219/126; 29/471.1; 228/45

[56] References Cited
UNITED STATES PATENTS

| | | | |
|---|---|---|---|
| 2,792,490 | 5/1957 | Risch et al. | 219/137 |
| 3,462,579 | 8/1969 | Meister et al. | 219/125 R X |
| 3,560,698 | 2/1971 | Taylor | 219/125 PL |
| 2,068,166 | 1/1937 | Dodge | 219/125 R |
| 3,328,556 | 6/1967 | Nelson et al. | 219/125 RX |
| 3,610,867 | 10/1971 | Bartle | 219/126 X |
| 1,736,539 | 11/1929 | Lachman | 219/106 X |

Primary Examiner—J. V. Truhe
Assistant Examiner—L. A. Shutzman
Attorney—Max L. Libman

[57] ABSTRACT

In welding together metal sheets to form walls, tanks or the like, a connecting strip is used which supports a rail spaced from its edges and which serves as a track for mounting a welding machine. The edges of two adjacent sheets to be welded together are placed so that each overlaps one edge of the connecting strip, and the welding machine is then traversed along the rail while welding at least one sheet edge to the part of the connecting strip which it overlaps.

6 Claims, 7 Drawing Figures

Patented June 19, 1973 3,740,526
3 Sheets-Sheet 1
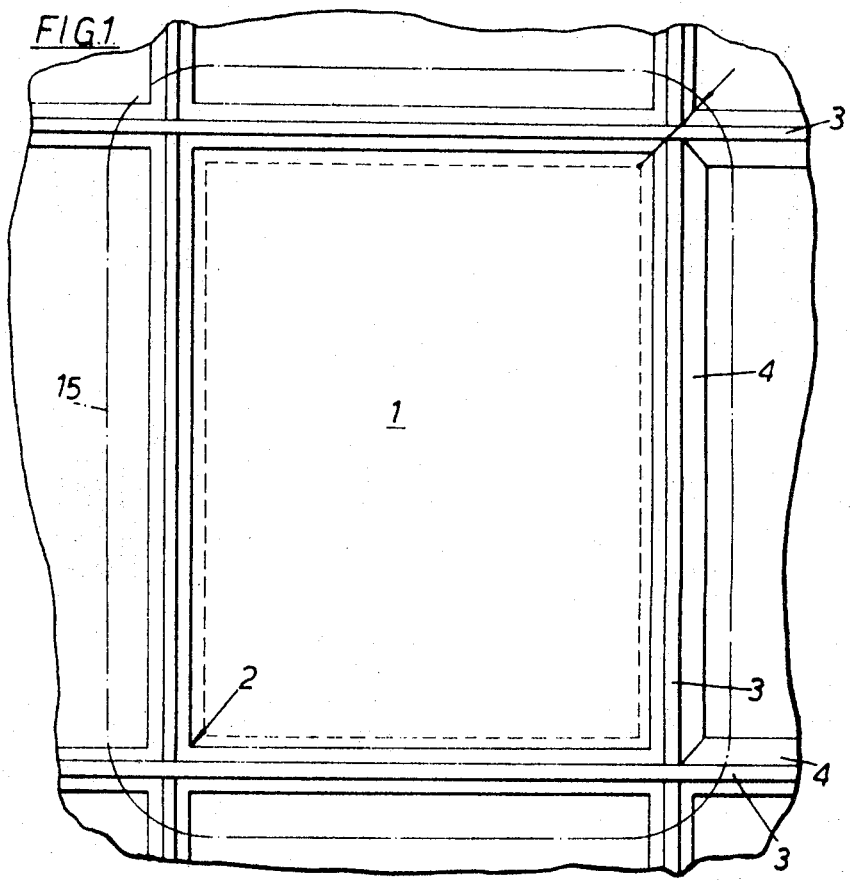
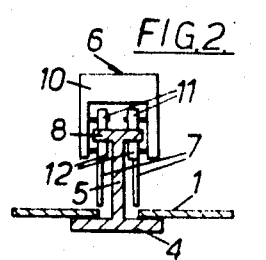
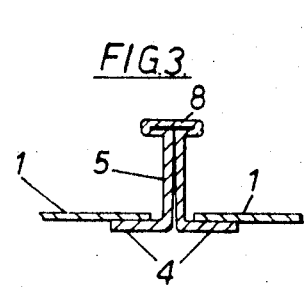
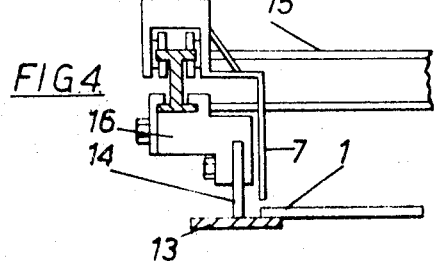
INVENTORS
Edward Armstrong
Robert G. Jackson
BY Marc L. Litman

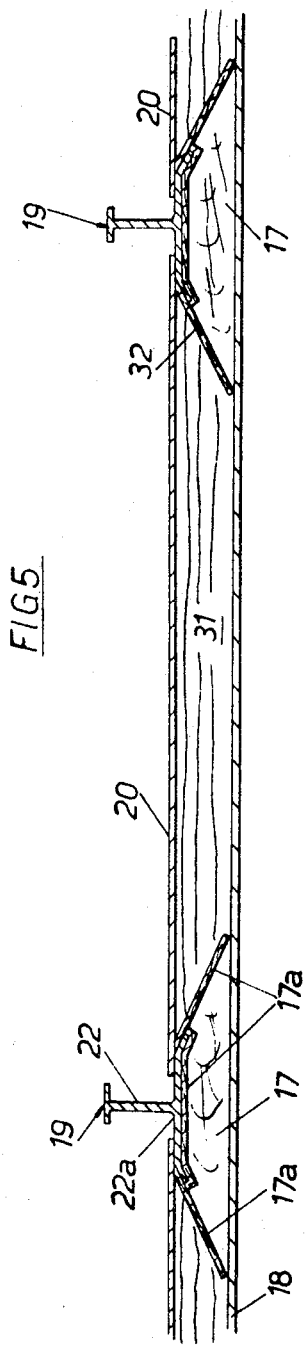

METHODS OF WELDING TOGETHER SHEETS TO FORM WALLS, TANKS OR THE LIKE

This invention relates to methods of welding together sheets to form walls, tanks or the like.

One known method comprises the use of a connecting member in the form of a strip. With this method an edge of each of two adjacent sheets is placed in overlapping relationship with the appropriate edge of the connecting strip and the edges of the sheets are then welded together via said strips. A disadvantage of this method is that it is not possible to provide for automatic welding of the sheet edges.

A second known method where automatic welding is possible is to provide upturned edges around the sheets and to weld adjacent sheets together via these edges. A disadvantage of this method, particularly where the assembled sheets have to withstand significant static and/or fluctuating loads, is that bending stresses are introduced around the radii of the upturned edges since welding can only be effected at a position spaced from the faces of the sheets i.e. above the radiussed or arcuate portions of the edges.

An object of this invention is to provide an alternative method whereby automatic welding of the edges of the sheets may be effected without the disadvantage referred to above concerning the second known method.

According to this invention, a method of welding together two sheets via a connecting member overlapped along edges thereof by the opposing edges of the two sheets comprises using a connecting member having a rail spaced from its said edges, overlapping the edge of each sheet with an edge of the connecting member, mounting a welding machine on the rail and traversing the welding machine along the rail while welding the sheet edge of the connecting member.

In one form of the invention the connecting members may be generally T-shaped in cross-section, the stem of the T providing the rail for the welding machine and the pair of arms of the T providing the edges to which the sheet edges are welded.

In another form of the invention the rail may be separate and held spaced from the connecting members by suitable supports.

A multiplicity of sheets may be provided and may be in the form of panels, in which case the connecting members are assembled as a framework having a frame opening for each panel. With such an arrangement, particularly in the case where the connecting member is of generally T-shape in cross-section, the welding machine is mounted in turn on each of the stems of the connecting members so as to effect welding of the panel around all of its edges. In the case where the rail is separate from the connecting members, this rail may be detachably mounted on its supports and may be in the form of a continuous rectangular loop offset from the frame opening and radiussed in the region of the corners of the frame opening. This enables the welding machine to traverse completely around the rail to effect welding of all the edges of each panel in a single operation.

In the case where the connecting members are of generally T-shaped cross-section, preferably the free ends of the stems are provided with a serif-like thickening so as to provide for positive location of the welding machine.

The T-shaped connecting members may be of solid section, for example, formed by extrusion, or fabricated from strips. Alternatively, these members may be formed by folding a flat sheet such that the stem of the T is in two parts which are joined at its free end and are free to flex relative to one another. Thus, should the wall, tank or the like to be constructed be required to withstand fluctuating or shock loads or a wide temperature variation it would be convenient to use this alternative form of connecting member, since it would also act as an expansion joint between the panels.

The welding machine may be provided with a pair of welding means arranged so that, with the machine mounted on said rail and with a sheet located on the connecting member on each side of its rail, the welding means extend on opposite sides of the rail whereby, when the welding machine is traversed along the rail, the adjacent edges of the two sheets are welded simultaneously to the connecting member.

The welding machine may also be provided with means for engaging each edge of each sheet or panel to be welded at a position in advance of the welding means, said means acting to press the edge against the co-operating part of the connecting members.

The invention may be used with advantage in the field of integrated tank containers for liquids at temperatures greatly differing from ambient temperature at substantially atmospheric pressure, for example, liquefied gases such as liquefied natural gas or methane, or liquefied petroleum gases such as ethane, butane, ethylene and propylene. These containers may provide static storage on land or may be incorporated in tankers for transportation by sea. An integrated tank container comprises essentially a primary membrane tank of thin and flexible fluid-tight material e.g. in the case of a liquefied gas, a metal which is not subject to cold embrittlement, which lines and is supported within a housing of load-bearing thermal insulation material, the housing being enclosed within and supported by a rigid outer shell. A secondary membrane similar to the primary membrane may be provided around the housing of load-bearing insulation. It is common practice to construct the membrane or membranes from within the container from sheets or panels which are welded together along their edges. The present invention may be used to effect this welding using connecting members between the sheets or panels.

Thus, for example, in the case where the integrated tank container comprises primary and secondary membranes, this container may be constructed by assembling a first framework of connecting members on the rigid outer shell, welding a first set of panels of suitable thin and flexible fluid-tight material in the frame openings in accordance with the method desribed hereinbefore to form the secondary membrane, laying panels of load-bearing thermal insulation material over the secondary membrane, and locating these panels using the rails of the connecting members of the first framework, assembling a second framework of said connecting members on the inner faces of the insulation panels, and welding a second set of suitable thin and flexible fluid-tight material in the frame openings of said second framework also in accordance with the method described hereinbefore to form the primary membrane.

Alternatively, the integrated tank container may be constructed using connecting members generally of T-shape but having two spaced pairs of arms, in which case a single framework of said connecting members is attached to the rigid outer shell, and first and second sets of membrane panels are welded in turn in the two sets of frame openings provided by the two pairs of arms, the insulation panels being located in position between the two sets of membrane panels prior to the welding of the second set of membrane panels.

In order that the invention may be readily understood an embodiment thereof and various modifications will now be described by way of example with reference to the accompanying diagrammatic drawings, in which FIG. 1 is an elevation of part of a wall showing its construction;

FIG. 2 is a cross-section of one form of connecting member carrying a welding machine;

FIG. 3 is a cross-section of a second form of connecting member;

FIG. 4 is a cross-section of a third form of connecting member carrying a welding machine;

FIG. 5 is a section through the wall of an integrated tank container constructed in accordance with the invention.

Figure 6:
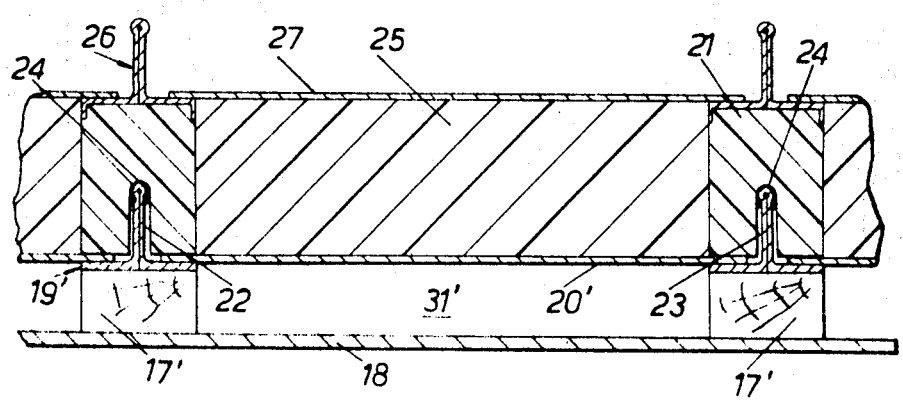
FIGS. 6 and 7 are views similar to FIG. 5 showing two alternative forms of construction in accordance with the invention for an integrated tank container.

Referring to FIG. 1 of the drawings, the wall is constructed from a number of rectangular metal panels 1 and a lattice framework 2. The framework is assembled from metal frame members 3 of generally T-shaped cross-section welded together to provide rectangular frame openings for the panels 1. The pair of arms 4 (see FIG. 2) of the frame members 3 provide marginal flanges for the panels 1, the stems 5 of the members extending from a common side of and perpendicular to the wall. Each panel 1 has dimensions such that it fits within the stems 5 of its frame opening with its edges overlapping the marginal flange provided by the arms 4. A welding machine 6 is then located in turn on the stem of each individual frame member defining the frame opening and traversed along said frame member with its welding head 7, e.g. a welding electrode, directed towards the respective edge of the panel to effect welding. The welding machine 6 also carries a finger (not shown) which engages the panel in advance of the welding head 7 during the traversing operation so as to press said edge firmly against its flange and thus facilitate welding. If desired, as shown in FIG. 2, the machine may have a welding head 7 and an engaging finger on each side of the machine 6 so as to effect simultaneous welding of the adjacent edges of the two panels located on each side of the frame member 3. In this embodiment, the frame members 3 are provided with serif-like thickenings 8 (see FIG. 2) to provide for positive mounting of the welding machine 6. As shown in FIG. 2, the welding machine 6 may include a carriage 10 having two sets of wheels 11, 12 which engage and embrace the thickening 8. The T-shaped frame members 3 may be of solid section as shown in FIG. 2 and may be formed, for example, as extrusions, or by fabrication of metal strips. Alternatively, as shown in FIG. 3, the frame members 3 may be formed by folding from a flat metal sheet. In this alternative form the stem 5 of the frame member is provided by doubling over the sheet and the two portions of the stem thus provided are free to flex relative to one another. This form of frame member may thus be used to act as an expansion joint between the panels 1 in constructions where the wall may be subjected to fluctuating or shock loads or wide variations in temperature. Alternatively, if this form of frame member is not required to act as an expansion joint, the pairs of arms 4 thereof may be welded together to provide a solid connection between the panels 1.

Referring to FIG. 4, instead of providing a generally T-shaped frame member 3, this member may be in the form of a strip 13 provided at selected positions along its length with upright supports 14 for a separate rail 15. The separate rail 15 is arranged in an endless rectangular loop, as shown chain dotted in FIG. 1, which is radiussed in the regions of the corners of the frame opening, the center of each radius co-inciding with the point of its respective corner of panel 1. The rail 15 is connected to the supports 14 by a suitable clamping arrangement 16 so that the rail may be moved in turn from one frame opening to another to complete the wall construction. Thus, the arrangement is such that the rail is mounted over each frame opening and the welding machine 6 is traversed completely around the rail 15 to effect welding of all the edges of the respective panel 1 in a single operation.

Where the method is to be applied to an integrated tank container for liquefied gas having at least a primary membrane, as is known and as mentioned hereinbefoe, the membrane material may be of a material having a very low co-efficient of expansion e.g. an iron nickel alloy such as that sold under the Registered Trademark "INVAR". With such material it would be sufficient to provide solid section connecting members since the welding together of the membrane sheets is achieved on the faces thereof and hence problems from bending stress would not be encountered. However, where the material to be used has a higher co-efficient of expansion, for example, aluminum or stainless steel, it may be advantageous to use connecting members in the form shown in FIG. 3, to provide relief for the stresses set up in the membrane during loading and unloading of the liquefied gas.

Referring to FIG. 5 of the drawings, the method is shown applied to an integrated tank container for liquefied gases having a primary membrane barrier and a secondary thermal insulation barrier. Thus, a rectangular framework of balsa frame members 17 with plywood facings 17a is attached to the rigid outer shell 18, and in turn carry the framework of T-shaped connecting members 19. The spaces 31 defined by the frame members 17 are filled with a thermal insulation material which is of a quality sufficient to prevent penetration thereof by the liquefied gas, e.g. balsa wood, or polyurethane foam. In the embodiment shown in FIG. 5, polyurethane foam material is used and this is sprayed in layers into each space 31, the joints 32 between the frame members 17 and the foam being inclined as shown. The method of applying the polyurethane foam and the detail of the joints between the foam and the balsa frame members 17 are substantially as described in copending U.S Pat. Application Ser. No. 801,495. The final layer of polyurethane foam on curing would normally provide a rough and irregular surface and this surface is planed down to the level of the arms 22a of the connecting members 19 to provide a smooth supporting surface for the primary membrane. This could be achieved by a rotary planing device carried by a carriage adapted to traverse along the pairs of stems 22 of the connecting members 19. Finally a set of membrane panels 20 is welded in the openings provided by the framework of connecting members 19 in accordance with a method hereinbefore described with reference to FIGS. 1–4 to form the primary membrane tank.

If the integrity of the primary membrane tank at the positions of the connecting members 19 is sufficient it will be appreciated that the part of the plywood facing 17a between the arms 22a of the members and the balsa frame members 17 could be dispensed with.

Referring to FIG. 6 of the drawings, the method is shown applied to an integrated tank container for liquefied gases having primary and secondary membrane barriers each built up from panels of suitable thin and flexible fluid-tight material. Thus, a support framework of hardwood frame members 17' is attached to the rigid outer shell 18, a first framework 19' of connecting members is attached to the frame members 17' and a first set of membrane panels 20' are welded in the frame openings to form the secondary membrane. Elongated support members 21 of load-bearing thermal insulation, e.g. balsa wood are then located over the stems 22 of the framework 19, e.g. via slots 23 formed in the members 21. Preferably, as shown at 24, suitable clips may be provided in said slots for clipping and locating the members 21 onto their respective rails 23. Further load-bearing insulation panels 25 are then located in the spaces between the members 21 and a second framework 26 of connecting members is attached to the members 21. Alternatively, the members 21 may have their respective connecting members of the second framework 26 attached prior to their attachment to he first framework 19'. If necessary further means can be provided for rigidly connecting the frameworks 19', 26 and the panels 21 together, e.g. by extending the arms of the connecting members of framework 26 down the sides of their members 21 to below the level of the upper ends of the stems 22 of the connecting members of framework 19' and pinning through said arms stems 22 and members 21.

Finally, a second set of membrane panels 27 is welded in the frame openings of the second framework 26 to form the primary membrane. In an alternative arrangement the relatively thin members 21 may be dispensed with, in which case the panels 25 are laid in abutting relationship preferably with their edges staggered with respect to the connecting members of the first framework 19. In this arrangement the slots 23 would be formed in, and the connecting members of the second framework 26 would be attached to, the panels 25.

Figure 7:
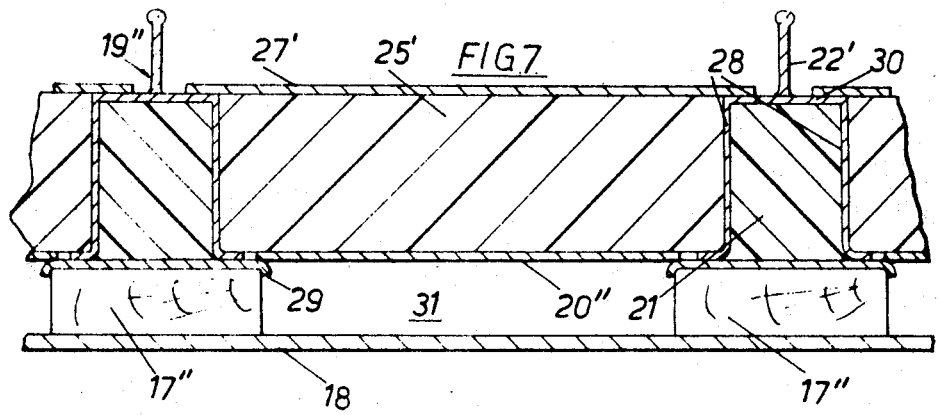

Referring to FIG. 7 in an alternative application of the method particularly suitable for an integrated tank container having membranes of a material having a very low co-efficient of expansion, e.g. "INVAR" (Registered Trademark), only one framework 19'' of connecting members is provided on the frame members 17'', these connecting members having extended side wall portions 28 which embrace the relatively thin insulation members 21' and are welded to a metal strip 29 attached to said frame members. The strips 29 thus provide further arms which are spaced from the arms 30 of the connecting members; the component parts 19'', 21' and 29 may be of prefabricated construction. Both sets of membrane panels 20'', 27' are then welded in position in turn using the stems 22' of the framework 19', the panels 20'' being welded in the frame openings defined by the strips 29 and the penels 27' being welded into frame openings defined by the arms 30 of the framework. The insulation panels 25' are located within the spaces left between the walls 28 of the framework 19 before welding the membrane panels 27'.

In both the arrangements described in FIGS. 6 and 7, the spaces 31 between the secondary membrane and the rigid outer shell 18 may be filled with a suitable thermal insulation material, e.g. a loose granular material such as that sold under the Registered Trademark "PERLITE", or polyurethane foam, or blasa wood; these last two mentioned materials would have the advantages of supporting the secondary membrane panels 20 between the frame members 17, and providing a further barrier to the liquefied gas.

Advantages of the container arrangements described with reference to FIGS. 6 and 7 are as follows:

i. The framework provided by the frame members such as 17 may be designed such that to a large extent if not completely the membrane panels such as 20, 27 and insulation panels such as 21, 25 may be of standard sizes, thus facilitating assembly on site.

ii. Because the secondary membrane provided by the panels such as 20 is tied to the frame members such as 17 it is not necessary to provide a load-bearing insulation around this membrane.

With regard to the arrangement of FIG. 7, additional advantages are as follows:

iii. The primary membrane provided by the panels 27' is rigidly tied to the frame members 17' via the wall portions 28 of connecting members. Although these portions 28 provide heat paths through the insulation panels 21', 25', the effect of these heat paths is minimized by the connecting members being of thin material iv Because the spaces containing the insulation panels 21', 25' are separated by the portions 28, should the primary membrane be punctured in use, any damage is localized.

v. Because the insulation panels 21', 25' are constrained by the wall portions 28 and these latter are rigidly tied to the frame members 17'' the primary membrane is held substantially in position and thus each plane wall portion of the container is independent of the adjacent plane wall portions; the corner arrangement may therefore be of any desired shape to fill the spaces between adjacent plane wall portions.

We claim:

1. a. A method employed in lap welding together two thin sheets via a connecting strip member, comprising b. providing said connecting strip member with a rail between and spaced from its said edges, and extending perpendicular to said member, in inverted-T fashion, c. overlapping the edge of each sheet with an edge of the connecting member, so that one face of the sheet is in contact with one face of the strip near an edge, d. mounting a welding machine on the said rail and traversing the welding maching along the rail while welding the connecting member to the face of at least one sheet near its edge, at said contacting faces.

2. A method according to claim 1, e. and the further step of proving a serif-like transversely thickened portion at the free edge of said rail, and positively supporting said welding maching on said thickened portion by sliding engagement with said thickened portion.

3. A method according to claim 1,
   e. wherein said welding step is performed by simultaneously and independently welding each of said two thin sheets to the same face of the connecting strip on opposite sides of said rail as the welding machine traverses the rail.

4. A method according to claim 1,
   e. and assembling said connecting strips as a framework for supporting said sheets as panels prior to said welding operation.

5. A method according to claim 4,
   f. and employing said welding operation to weld said sheets to said framework to provide a wall area of thin sheets, each supported at its edges by said framework.

6. A method according to claim 1,
   e. wherein said rail is removably supported by said connecting strip, and the further step of removing said rail from the step after the welding operation is performed.

* * * * *